US 7,984,041 B1

(12) United States Patent
Patil (10) Patent No.: US 7,984,041 B1
(45) Date of Patent: Jul. 19, 2011

(54) DOMAIN SPECIFIC LOCAL SEARCH

(75) Inventor: Yogesh Y Patil, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 385 days.

(21) Appl. No.: 11/774,922

(22) Filed: Jul. 9, 2007

(51) Int. Cl.
*G06F 17/30* (2006.01)

(52) U.S. Cl. ........ 707/715; 707/696; 707/711; 707/739; 707/740; 707/741; 707/742; 707/743; 707/744; 707/745; 707/746

(58) Field of Classification Search ................ 707/696, 707/711, 715, 739–746
See application file for complete search history.

(56) References Cited

U.S. PATENT DOCUMENTS

| | | | | |
|---|---|---|---|---|
| 5,710,916 A * | 1/1998 | Barbara et al. | | 1/1 |
| 5,832,475 A * | 11/1998 | Agrawal et al. | | 1/1 |
| 5,852,822 A * | 12/1998 | Srinivasan et al. | | 1/1 |
| 5,857,180 A * | 1/1999 | Hallmark et al. | | 1/1 |
| 6,003,036 A * | 12/1999 | Martin | | 1/1 |
| 6,049,649 A * | 4/2000 | Arai | | 385/133 |
| 6,058,392 A * | 5/2000 | Sampson et al. | | 1/1 |
| 6,098,066 A * | 8/2000 | Snow et al. | | 707/3 |
| 6,141,655 A * | 10/2000 | Johnson et al. | | 1/1 |
| 6,349,308 B1 * | 2/2002 | Whang et al. | | 1/1 |
| 6,374,232 B1 * | 4/2002 | Dageville et al. | | 1/1 |
| 6,374,253 B1 * | 4/2002 | Weider et al. | | 707/102 |
| 6,457,004 B1 * | 9/2002 | Nishioka et al. | | 1/1 |
| 6,490,575 B1 * | 12/2002 | Berstis | | 1/1 |
| 6,594,654 B1 * | 7/2003 | Salam et al. | | 1/1 |
| 6,678,687 B2 * | 1/2004 | Watanabe et al. | | 1/1 |
| 6,772,141 B1 * | 8/2004 | Pratt et al. | | 707/3 |
| 6,891,566 B2 * | 5/2005 | Marchese | | 348/211.3 |
| 6,976,053 B1 * | 12/2005 | Tripp et al. | | 709/202 |
| 2007/0038665 A1 * | 2/2007 | Kwak et al. | | 707/102 |
| 2008/0294605 A1 * | 11/2008 | Prahlad et al. | | 707/3 |

OTHER PUBLICATIONS

Schroeder, Linux Cookbook, Nov. 29, 2004, O'Reilly Media, Inc., p. 436, ISBN: 978-0-596-00640-2.*

* cited by examiner

*Primary Examiner* — Frantz Coby
(74) *Attorney, Agent, or Firm* — Brooks Kushman P.C.

(57) ABSTRACT

Methods and apparatus provide for a local search indexer to allow for an optimized search within a web server that returns accurate search results while maintaining independent control as to defining search patterns, search prioritization, and updated content available for search. Specifically, the local search indexer organizes content according to a hierarchical directory structure at a web server. The hierarchical directory structure includes at least one directory level that provides at least one directory for storing the content. The local search indexer builds a search index associated with the directory and stores the search index at the web server. The search index is populated with indexed content based on an update of the content stored in the directory. The local search indexer employs a search engine, at the web server, to process search queries against the indexed content to provide a search result that includes the update of the content.

13 Claims, 6 Drawing Sheets

DOMAIN SPECIFIC LOCAL SEARCH

BACKGROUND

Conventional computer networking environments support the exchange of information and data between many interconnected computer systems using a variety of mechanisms. In an example computer-networking environment such as the Internet, one or more client computer systems can operate client software applications that transmit data access requests using one or more data communications protocols over the computer network to server computer systems for receipt by server software application(s) executing on those servers. The server software application(s) receive and process the client data access requests and can prepare and transmit one or more server responses back to the client computer systems for receipt by the client software applications. In this manner, client/server software applications can effectively exchange data over a network using agreed-upon data formats.

One example of a conventional information exchange system that operates between computer systems over a computer network such as the Internet is provided by a set of applications and data communications protocols collectively referred to as the World Wide Web. In a typical conventional implementation of the World Wide Web, client computer systems operate a client software application referred to as a web browser. A typical web browser operates to provide hypertext transport protocol (HTTP) requests for documents, referred to as "web pages," over the computer network to web server computer systems. A web server software application operating in the web server computer system can receive and process an HTTP web page request and can return or "serve" a corresponding web page document or file specified (i.e., requested) in the client request back to the requesting client computer system over the computer network for receipt by the client's web browser. The web page is typically formatted in a markup language such as the hypertext markup language (HTML) or the extensible markup language (XML).

The World Wide Web contains billions of static web pages, and it is growing at a very fast speed, with many hundreds or thousands of web pages being created and placed for access on the Internet each day. To be able to efficiently access web pages of interest to people using web browsers, software developers have created web sites that operate as search engines or portals.

Conventional search engines operate algorithmically and are most often implemented as Web search engines to locate and rank information on the public Web. Other kinds of search engine are enterprise search engines, which search on intranets, personal search engines, and mobile search engines. Some conventional search engines also mine data available in newsgroups, databases, or open directories.

Most conventional search engines operate according to the following phases: (1) web crawling, (2) indexing, and (3) searching. Indexing (or "Internet indexing") includes back-of-book-style indexes to individual websites or an intranet, and the creation of keyword metadata to provide a more useful vocabulary for Internet or onsite search engines. With the increase in the number of periodicals that have articles online, web indexing is also becoming important for periodical websites. Metadata web indexing involves assigning keywords or phrases to web pages or web sites within a meta-tag field, so that the web page or web site can be retrieved with a search engine that is customized to search the keywords field. This may or may not involve using keywords restricted to a controlled vocabulary list.

A typical conventional search engine includes one or more web crawler processes that are constantly identifying newly discovered web pages. This process is frequently done by following hyperlinks from existing web pages to the newly discovered web pages. Upon discovery of a new web page, the search engine employs an indexer to process and index the content such as the text of this web page within a searchable database by producing an inverted index. Generally, an inverted index is defined as an index of the words in the texts. A searcher then processes user search requests against the inverted index. When a user operates his or her browser to visit the search engine web site, the search engine web page allows a user to enter one or more textual search keywords that represent content that the user is interested in searching for within the indexed content of web pages within the search engine database. The search engine uses the searcher to match the user supplied keywords to the inverted indexed content of web pages in its database and returns a web page to the user's browser listing the identity (typically a hyperlink to the page) of web pages within the world wide web that contain the user supplied keywords. Popular conventional web search engines in use today include Google (accessible on the Internet at http://www.google.com/), Yahoo! (http://www.yahoo.com/) and many others.

When a user comes to the search engine and makes a query, typically by giving key words, the engine looks up the index and provides a listing of best-matching web pages according to its criteria, usually with a short summary containing the document's title and sometimes parts of the text. Most search engines support the use of the boolean terms AND, OR and NOT to further specify the search query. An advanced feature is proximity search, which allows users to define the distance between keywords.

The usefulness of a search engine depends on the relevance of the result set it gives back. While there may be millions of webpages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Google is a registered trademark of Google, Inc. of Mountain View, Calif., USA. Yahoo! is a registered trademark of Yahoo!, Inc. of Sunnyvale, Calif., USA.

SUMMARY

Conventional computer systems suffer from a variety of deficiencies. For example, as web crawling is used to fetch content from websites, typical search engines process content from entire web pages to build search patterns. Some conventional search engines even cache the web pages to produce faster results. Often, updates and modifications to content can take a very long time to be reflected in a conventional search engine's results, thus a user is given stale (i.e. out of date) search results. Even worse, sometimes search results are based on cached web pages that have since been taken down or modified. Moreover, websites do not have independent control over the content that is made available for search and cannot influence the search prioritization applied to website content.

Techniques discussed herein significantly overcome the deficiencies of conventional applications such as those discussed above as well as additional techniques also known in the prior art. As will be discussed further, certain specific embodiments herein are directed to a local search indexer.

The one or more embodiments of the local search indexer as described herein contrast with conventional search applications to return search results that include the most current version of searchable content while maintaining independent control as to defining search patterns and search prioritization. By maintaining a search index for a directory to catalogue updates to the directory's content, the search process is optimized and the accuracy and type of content retrieved can be controlled. Such updates can include modifications made to the content, a search prioritization of the content, and/or a search ranking applied to the content.

Specifically, the local search indexer organizes content according to a hierarchical directory structure at a web server. The hierarchical directory structure includes directory levels with directories for storing the content. The local search indexer builds a search index associated with each directory and stores the search index at the web server. The search index is populated with indexed content, which is based on an update(s) of the content stored at the corresponding directory. A search engine is employed, at the web server, to process one or more search queries (queried at the web server or relayed from a third party search engine) against the indexed content. Thus, the search indices can process search queries to provide search results that can include the content updates.

In a particular embodiment, the local search indexer can build a plurality of search indices when the hierarchical directory structure includes a plurality of directories at a plurality of (i.e. multiple) directory levels. Therefore, each search index is exclusively associated with one directory and stored at the web server. In other words, each directory of every directory level may have an associated search index.

To further optimize search on the web server, in another embodiment, the local search indexer builds an aggregated search index that is populated with indexed content from directories from two or more directory levels. The indexed content in the aggregated search index is based on the content stored at such directories.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Sun Microsystems Incorporated of Santa Clara, Calif., U.S.A., herein after referred to as "Sun."

BRIEF DESCRIPTION OF THE DRAWINGS

The foregoing and other objects, features and advantages of the invention will be apparent from the following more particular description of embodiments of the methods and apparatus for a local search indexer, as illustrated in the accompanying drawings and figures in which like reference characters refer to the same parts throughout the different views. The local search indexer allows for an optimized search within a web server that returns more accurate search results while maintaining independent control as to defining search patterns, search prioritization, and updated content available for search. The drawings are not necessarily to scale, with emphasis instead being placed upon illustrating the embodiments, principles and concepts of the methods and apparatus in accordance with the invention.

DETAILED DESCRIPTION

Methods and apparatus disclosed herein provide for a local search indexer to allow for an optimized search in order to return accurate search results while maintaining independent control as to defining search patterns, search prioritization, and updated content available for search. In particular, the local search indexer builds a search index that indexes content from a directory of the web server. The indexed content is based on the directory's content and content updates. The local search indexer allows a search engine (hosted at the web server) to search through the search index to create search results that more accurately reflect the current version of the content in the directory.

In one embodiment, the web server maintains a hierarchical directory structure that provides multiple directories at one or more directory levels. Although there is no limit on how much content can be stored in a single directory, the content of a website is organized across this hierarchical directory structure based on subject matter and themes, for example. The directories can store web page content that can be static information, dynamic information, updated information, and/or links to other information or files outside of the web server and to information within the web server. Thus, the local search indexer can create a search index for each directory, regardless of the directory's directory level (i.e. position in the hierarchical directory structure). Each search index is associated with a directory and is populated with indexed content based on updates to the stored content located in that associated directory.

By maintaining a search index of updates to the content of each directory, the search process is optimized and the accuracy and type of content (e.g. web page data) retrieved as search results can be controlled. For instance, if a search index is not available at a particular directory level then the local search indexer can attempt to query a search index located at an upper (i.e. higher) directory level. Additionally, by implementing the local search indexer, a website can have complete control over defining and rating search patterns (i.e. algorithms) as well. Hence, the local search indexer contrasts with the typical "domain" specific search associated with conventional search engines.

According to one embodiment of local search indexer, the pattern of the search need not line up with the directory level of the actual search index that contains the most relevant search results. By leveraging the hierarchical directory structure, the local search indexer can build aggregated search indices that provide indexed content (based on content updates) from multiple directories that occur at different directory levels. For example, site "example.com" can be hosted at a web server that has a hierarchical directory structure that is 6 levels in depth (i.e. levels 1-6). In order to optimize the search for a user who wants to query content available from directory level 3 to directory level 6, the local search indexer builds an aggregated search index that indexes content from all directory levels below directory level 3. By storing the aggregated search index at a particular directory level (e.g. storing the aggregated search index for levels 3-6 at directory level 3), search query execution over levels 3-6 can be restricted to a single directory level (i.e. directory level 3) rather than performing a search algorithm that queries all the search indices occurring at directory levels 3-6. In other words, the local search indexer can query directory level 6 from directory level 3 by executing the query against aggregated search index. Thus, by building such aggregated search indices at various intermediate levels, search efficiency and time cost is greatly improved.

The local search indexer further allows a website owner to decide (i.e. manage, define, modify) the depth and attributes of the content and directories. For example, a website showing pictures and video clips of ancient art can classify the content according to text patterns to enable a better search on such content. In another embodiment, since the type of the content can be known, content classifications can be used in the search indices to more easily provide relevant and up-to-date search results.

Figure 1:
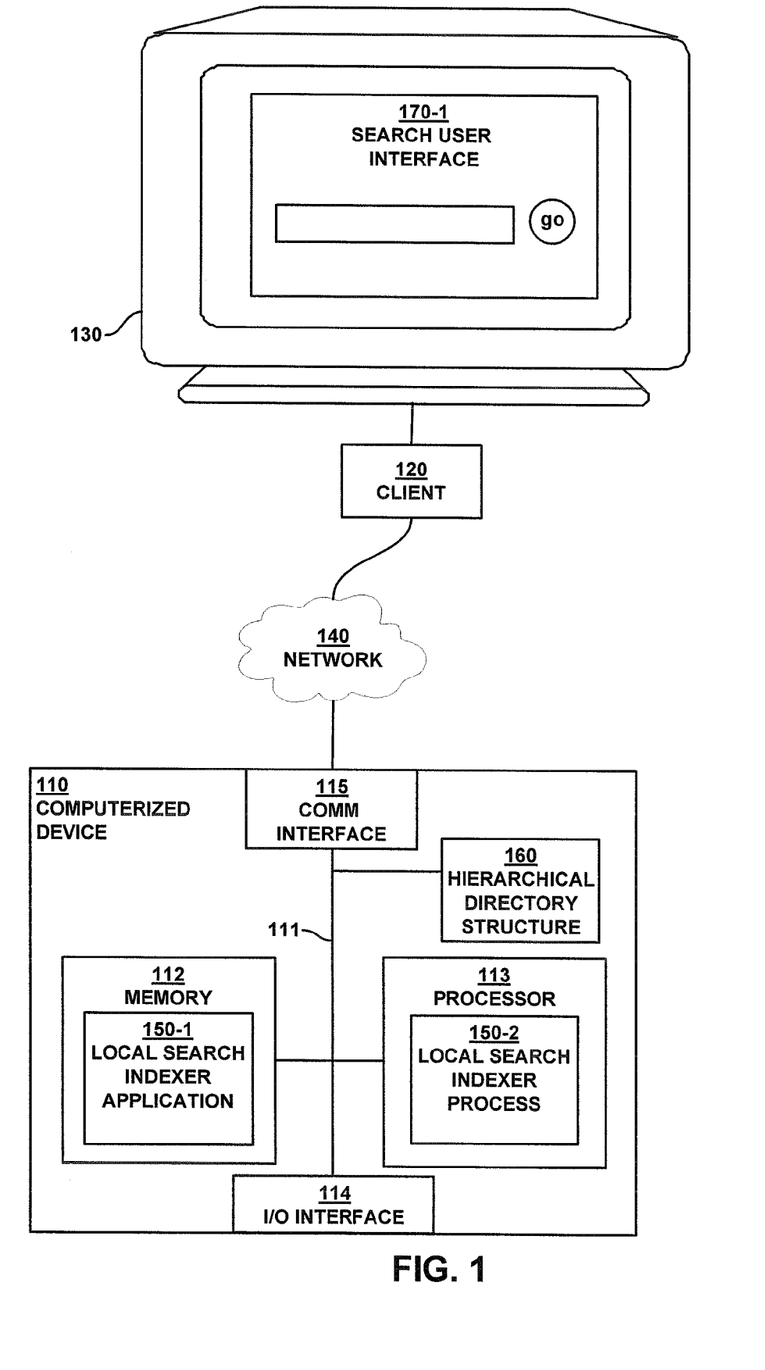
FIG. 1 is a block diagram of an architecture for a computer system configured with a local search indexer according to embodiments herein.

Turning now to FIG. 1, a block diagram illustrates an example of architecture for a computer system 110 that executes, runs, interprets, operates or otherwise performs a local search indexer application 150-1 and/or local search indexer process 150-2 (e.g. an executing version of the application 150-1 controlled by user) according to embodiments herein. The computer system 110 may be any type of computerized device such as a personal computer, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130. The display 130 of client 120 provides a search user interface 170-1 to perform a search (via the network 140) through the hierarchical directory structure 160 via a local search indexer 150 in order provide the user with search results. An input device (e.g., one or more user/developer controlled devices such as a keyboard, mouse, touch pad, etc.) couples to the computer system 110 and processor 113 through an input/output (I/O) interface 114.

The memory system 112 can be any type of computer readable medium and, in this example, is encoded with a local search indexer application 150-1 that supports generation, display, and implementation of functional operations as will be further explained herein.

During operation of the computer system 110, the processor 113 accesses the memory system 112 via the interconnect 111 in order to launch, run, execute, interpret or otherwise perform the logic instructions of the local search indexer application 150-1. Execution of the local search indexer application 150-1 in this manner produces a local search indexer process 150-2. In other words, the local search indexer process 150-2 represents one or more portions or runtime instances of the local search indexer application 150-1 (or the entire application 150-1) performing or executing within or upon the processor 113 in the computerized device 110 at runtime.

Figure 2:
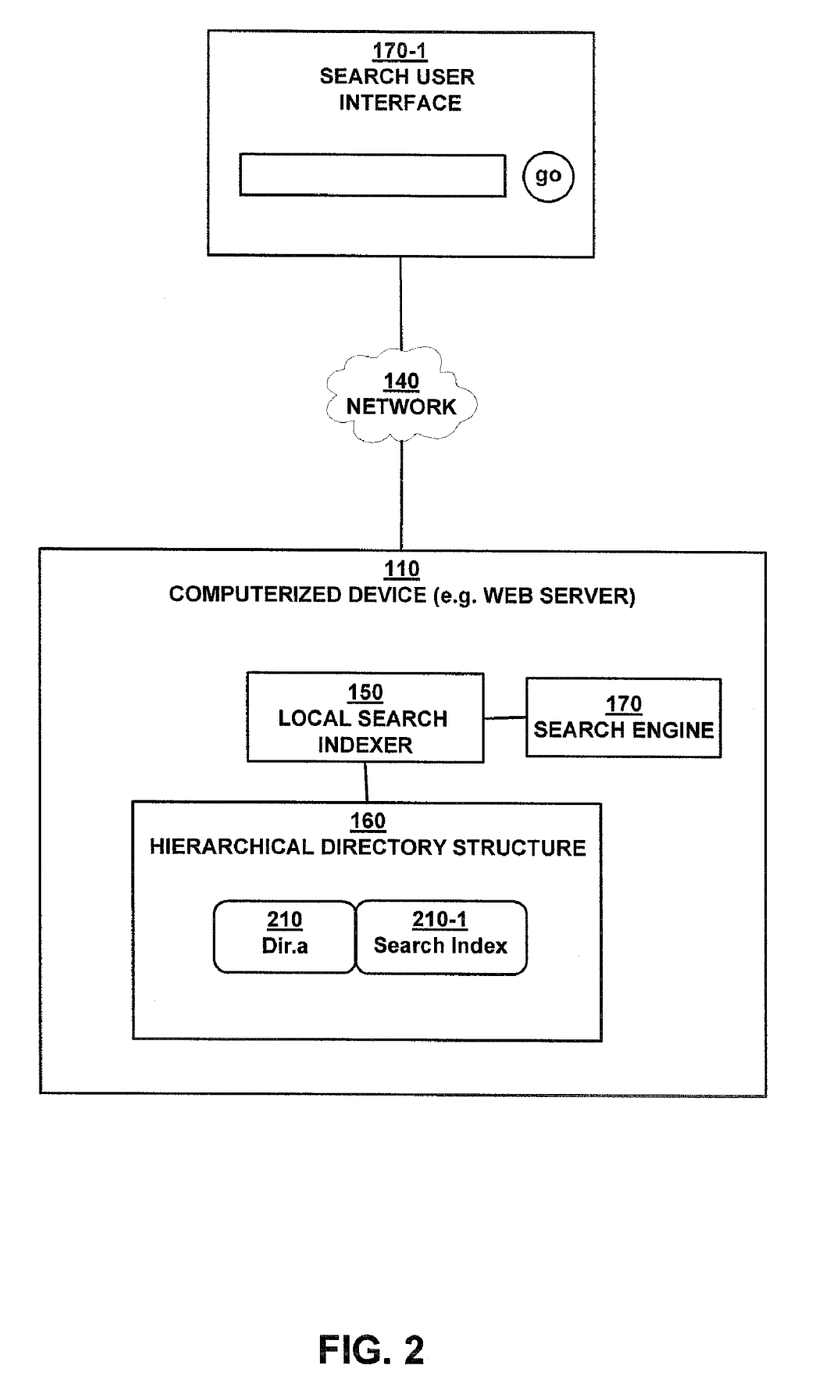
FIG. 2 is a block diagram of a web server according to embodiments of a local search indexer described herein.

FIG. 2 is a block diagram of a web server according to embodiments of a local search indexer described herein. In other words, the computerized device 110 can be a web server with the local search indexer 150 that communicates with a clients over a network 140. The local search indexer interacts with a search engine 170 (hosted at the web server 110) and the hierarchical directory structure 160. The hierarchical directory structure 160 is illustrated as having a single directory level. The directory level provides one directory 210 (Dir.a) that stores content (such as content for a website or a web page). As updates are made to the content in the directory 210, the local search indexer 150 builds a search index 210-1 that is directly associated with directory 210. The search index 210-1 is populated with indexed content that is based on the content in the directory 210 but also reflects the updates made to the content as the content is updated.

The search user interface 170-1 allows a user at a client to enter a search query and to send that query over the network 140 to the web server 110. In response to receiving the search query, the local search indexer 150 then manages the search engine 170 to perform a search through the hierarchical directory structure 160 in order provide the user with search results. The search engine 170 can perform a search pattern (e.g. multi-level search of search indices and aggregated search indices) upon the hierarchical directory structure 160 where the search pattern is defined at the web server 110—thereby allowing a website of the web server 110 greater control regarding how content is searched. As an example, the search engine 170 can implement an open search pattern (i.e. algorithm) and/or can interface with third party global search engines as well. In another example, a search pattern can traverse upwards (i.e. to more shallow levels) in the hierarchical directory structure 160 when the search pattern of the local search indexer 160 detects that there is no available search index at a "current" directory level. Thus, the local search indexer 150 allows the search engine 170 to search through the search index 210-1 of directory 210 to create search results that more accurately reflect the current version of the content in the directory 210.

Figure 3:
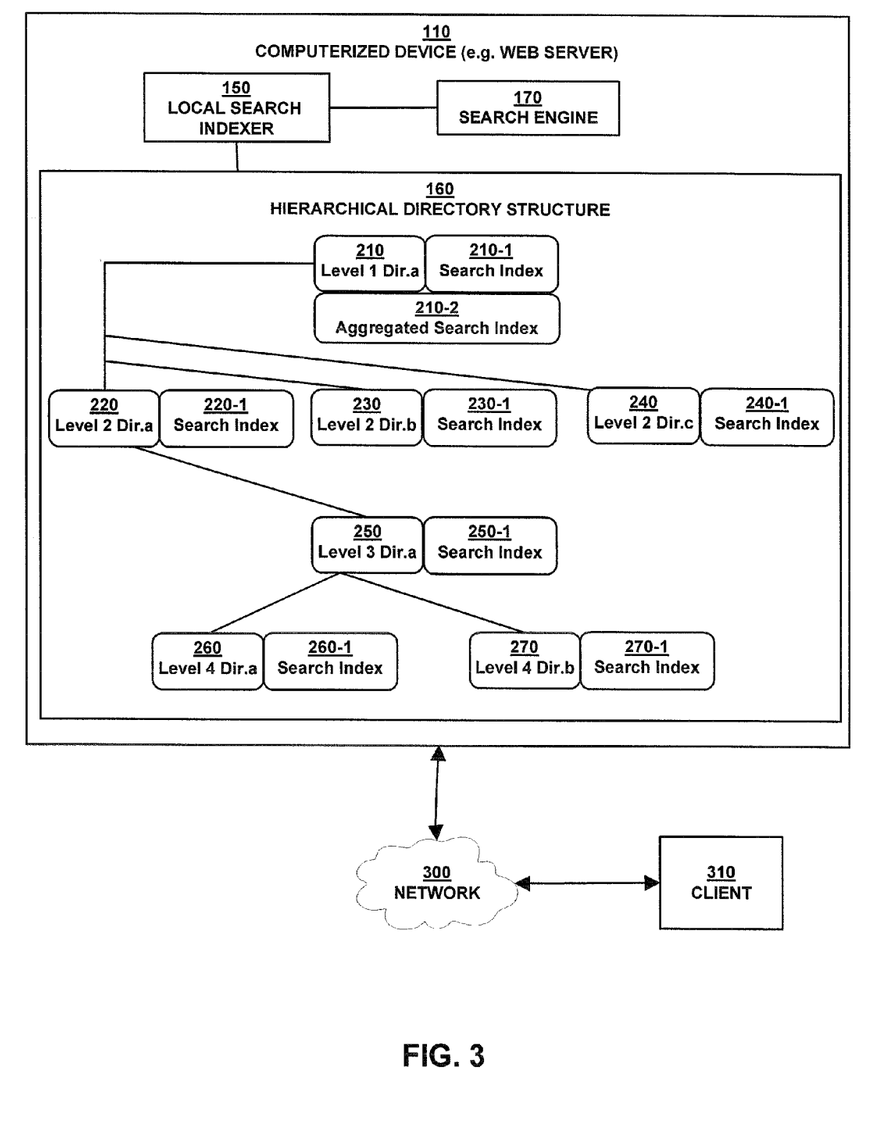
FIG. 3 is a block diagram of a hierarchical directory structure with search indices associated with directories according to embodiments of a local search indexer described herein.

FIG. 3 is a block diagram of a hierarchical directory structure with search indices associated with directories according to embodiments of a local search indexer described herein. FIG. 3 includes a computerized device 110, which can be a web server for hosting a website. The computerized device 110 includes the local search indexer 150 that interacts (e.g. controls, manages, builds, and directs) a hierarchical directory structure 160 and a search engine 170. A client 310 can allow a user to send one or more search queries to the local search indexer 150 at the computerized device 110 (web server) over the network 300. The hierarchical directory structure 160 provides a plurality of directories to organize and store website content across a plurality of directory levels.

Specifically, in one embodiment, the hierarchical directory structure 160 includes a total of seven directories across four directory levels. Directory level 1 has a directory 210 (Dir.a) that is associated with its own search index 210-1 and an aggregated search index 210-2. The search index 210-1 includes indexed content that is based on the content (e.g. website content) stored in the directory 210. Directory level 2 has three directories 220, 230, 240 (i.e. Dir.a, Dir.b, Dir.c) and each directory 220, 230, 240 is associated with its own search index 220-1, 230-1, 240-1, respectively. Each search index 220-1, 230-1, 240-1 includes indexed content that is based on the content stored in the associated directory 220, 230, 240. Directory level 3 has a directory 250 (Dir.a) that is associated with its own search index 250-1. The search index 250-1 includes indexed content that is based on the content stored in the directory 250. At directory level 4, there are two directories 260, 270 (i.e. Dir.a, Dir.b) each associated with a search index 260-1, 270-1, respectively. Again, each search index 260-1, 270-1 includes indexed content that is based on the content stored in the associated directory 260, 270. As in FIG.

2, it is understood that the indexed content in search indices 210-1, 220-1, 220-2, 230-1, 240-1, 250-1, 260-1, 270-1 are based on updates made to the content in the respective associated directories.

Returning to directory level 1 in the hierarchical directory structure 160, the aggregated search index 210-2 is associated with directory 210, but also includes indexed content based on directories below directory level 1. Specifically, in addition to indexed content from content stored in directory 210, the aggregated search index 210-2 includes indexed content from content stored at any other directories 220, 230, 240, 250, 260, 270 from directory levels two through four. The aggregated search index 210-2 can index content from any combination of directories 220, 230, 240, 250, 260, 270 from any combination of directory levels two through four.

The local search indexer 150 can employ the search engine 170 to execute a search algorithm (i.e. search pattern) to process a search query (received over the network 300) against the indexed content in the search indices 210-1, 220-1, 220-2 (the aggregated search index), 230-1, 240-1, 250-1, 260-1, 270-1 in the hierarchical directory structure 160. The local search indexer 150 allows for the search indices 220-1, 220-2, 230-1, 240-1, 250-1, 260-1, 270-1 to manage what type of content can be returned as search results. It is understood that performing a search over an aggregated search index can be included in a multi-level (i.e. complex) search query. Such search results can be influenced according to the ranking and/or prioritization of indexed content. For example, dynamic content can be prioritized over static content, updated content can be ranked ahead of "older" content, and secure content can be blocked from being returned in search results or can be redacted for specific search patterns. It is understood that the hierarchical directory structure 160 is not limited to the number of directories and the number of directory levels illustrated in FIG. 2 and FIG. 3. Also, it is understood that while, in FIG. 3, some directories reference other directories (like directory 220 referencing directory 250) such a referencing pattern is a mere example of how particular directories can reference ("point to") a directory while others do not.

Figure 4:
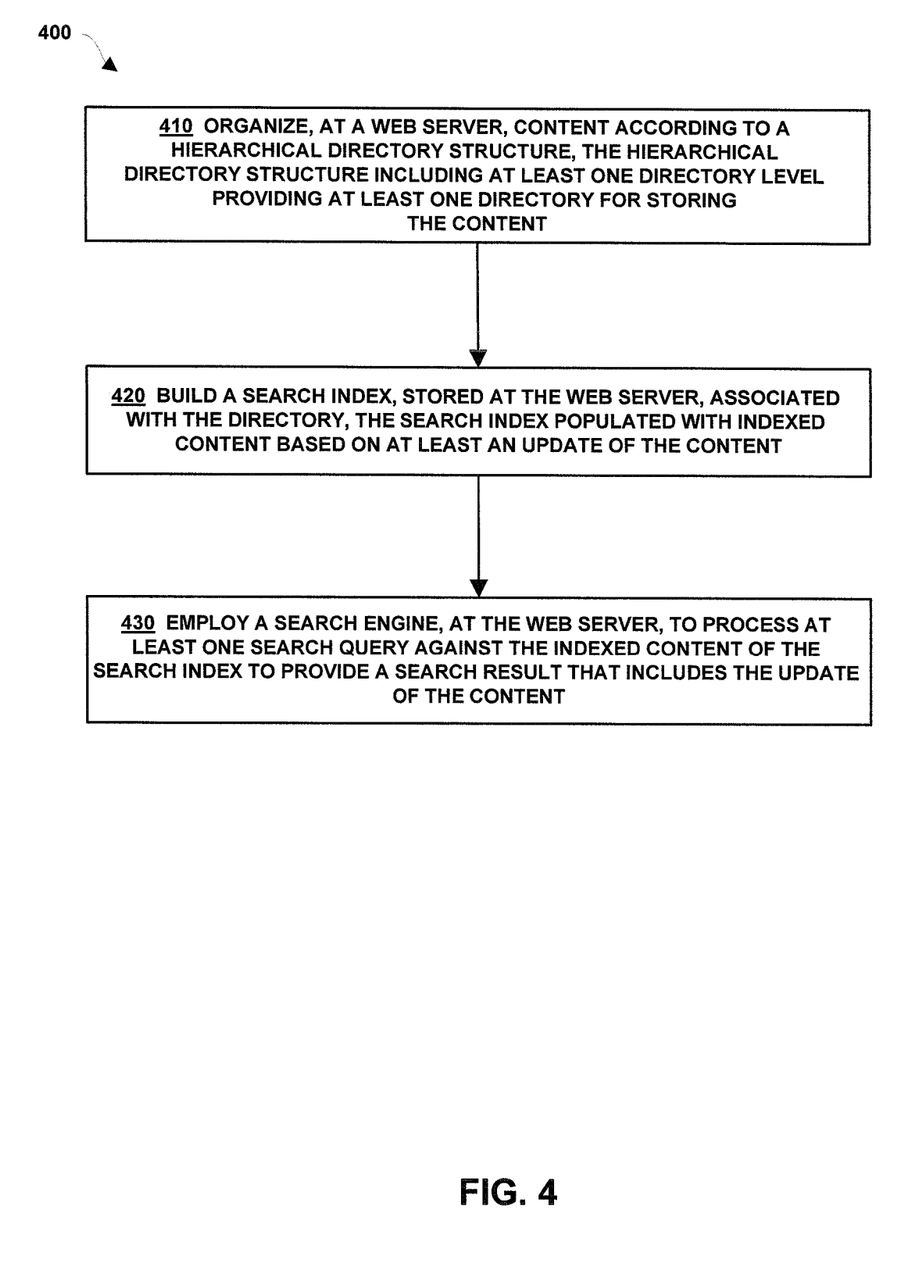
FIG. 4 is a flowchart of processing steps performed by a local search indexer to build a search index associated with a directory according to embodiments herein.

FIG. 4 is a flowchart 400 of processing steps 410-430 performed by a local search indexer 150 to build a search index associated with a directory according to embodiments herein. The steps in flowchart 400 refer to the features illustrated in the block diagrams of FIGS. 1, 2 and 3.

At step 410, the local search indexer 150 organizes content according to a hierarchical directory structure 160 at a web server 110. The hierarchical directory structure 160 includes at least one directory level that provides at least one directory 210 for storing the content.

At step 420, the local search indexer 150 builds the search index 210-1 associated with the directory 210 and stores the search index 210-1 at the web server 110. The search index 210-1 is populated with indexed content based on updates to the content stored in the directory 210. An update of the content can include modifications made to the content, a search prioritization of the content, and/or a search ranking applied to the content. For example, the local search indexer 150 can define a search prioritization that instructs search patterns to only return search results for content that has been updated during a certain range of time (i.e. the last 48 hours).

At step 430, the local search indexer 150 employs a search engine 170, at the web server 110, to process search queries against the indexed content of the search index 210-1 to provide a search result that includes the update of the content.

The local search indexer 150 can also build a plurality of search indices 210-1, 220-1, 220-2, 230-1, 240-1, 250-1, 260-1, 270-1 when the hierarchical directory structure 160 includes a plurality of directories at a plurality (i.e. multiple) of directory levels, such as in FIG. 3. Thereby, each search index is stored at the web server 110 and exclusively associated with one of the directories 210, 220, 230, 240, 250, 260, 270. In other words, each directory of every directory level has a search index reflecting updates made to the content of that directory.

Figure 5:
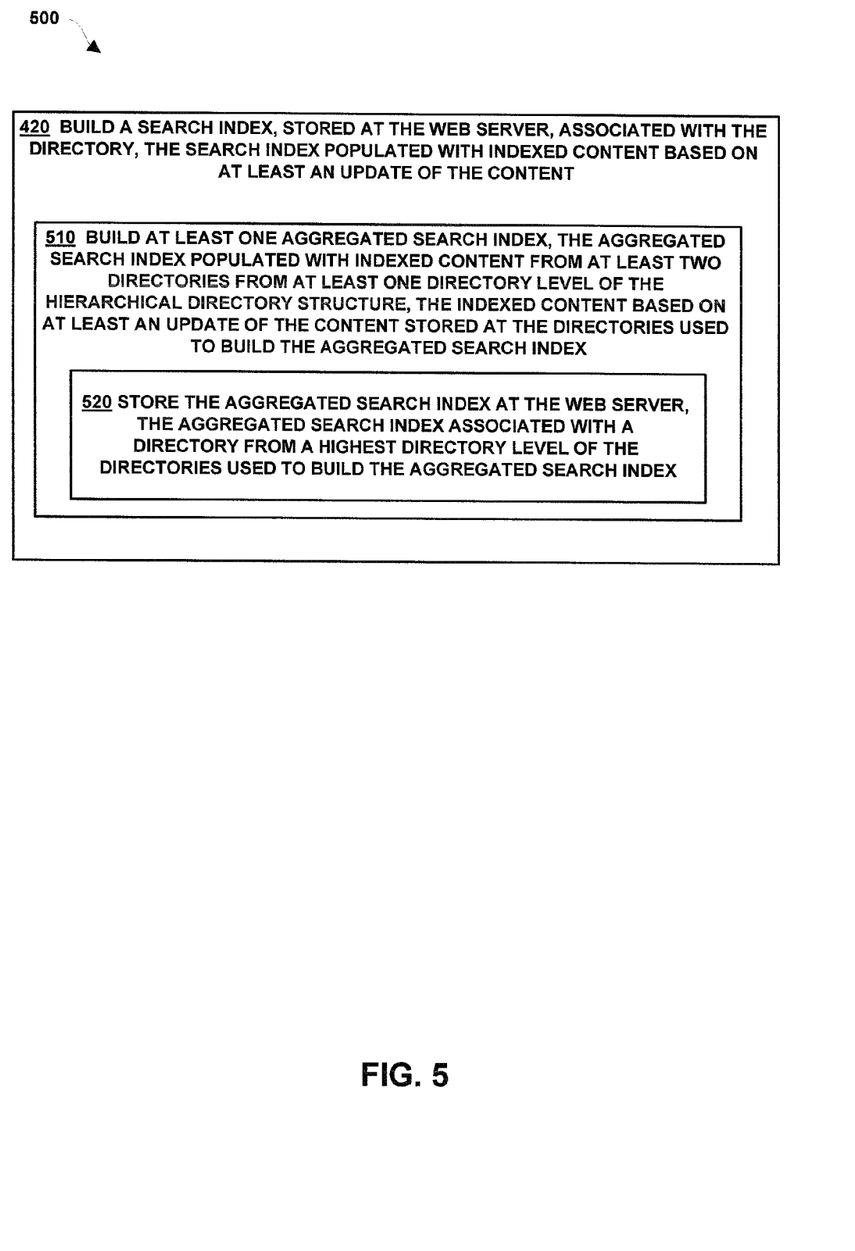
FIG. 5 is a flowchart of processing steps performed by a local search indexer to build an aggregated search index associated with a directory according to embodiments herein.

FIG. 5 is a flowchart 500 of processing steps 510-520 performed by a local search indexer 150 to build an aggregated search index associated with a directory according to embodiments herein. The steps in flowchart 500 refer to the features illustrated in the block diagrams of FIGS. 1, 2 and 3.

At step 510, the local search indexer 150 builds an aggregated search index. The aggregated search index 210-2 is populated with indexed content from two (or more) directories from one (or more) directory levels of the hierarchical directory structure. As with a search index for a directory, the indexed content in the aggregated search index 210-2 is based on updates to the content stored at the directories used to build the aggregated search index. For example, the aggregated search index 210-2 can provide indexed content from the search index 250-1 at directory level three and the search indices 260-1, 270-1 at directory level four. In the alternative, the aggregated search index 210-2 can provide indexed content from the all the search indices 220-1, 230-1, 240-1 at directory level two of the hierarchical directory structure 160.

At step 520, the local search indexer 150 stores the aggregated search index 210-2 at the web server 100. The aggregated search index 210-2 is associated with a directory 210 from a highest directory level (level 1) of the directories used to build the aggregated search index 210-2. In other words, if the aggregated search index 210-2 provides indexed content from directory levels one through three, then the aggregated search index 210-2 can be associated with a directory at the highest directory level (i.e. directory 210 of level one).

Figure 6:
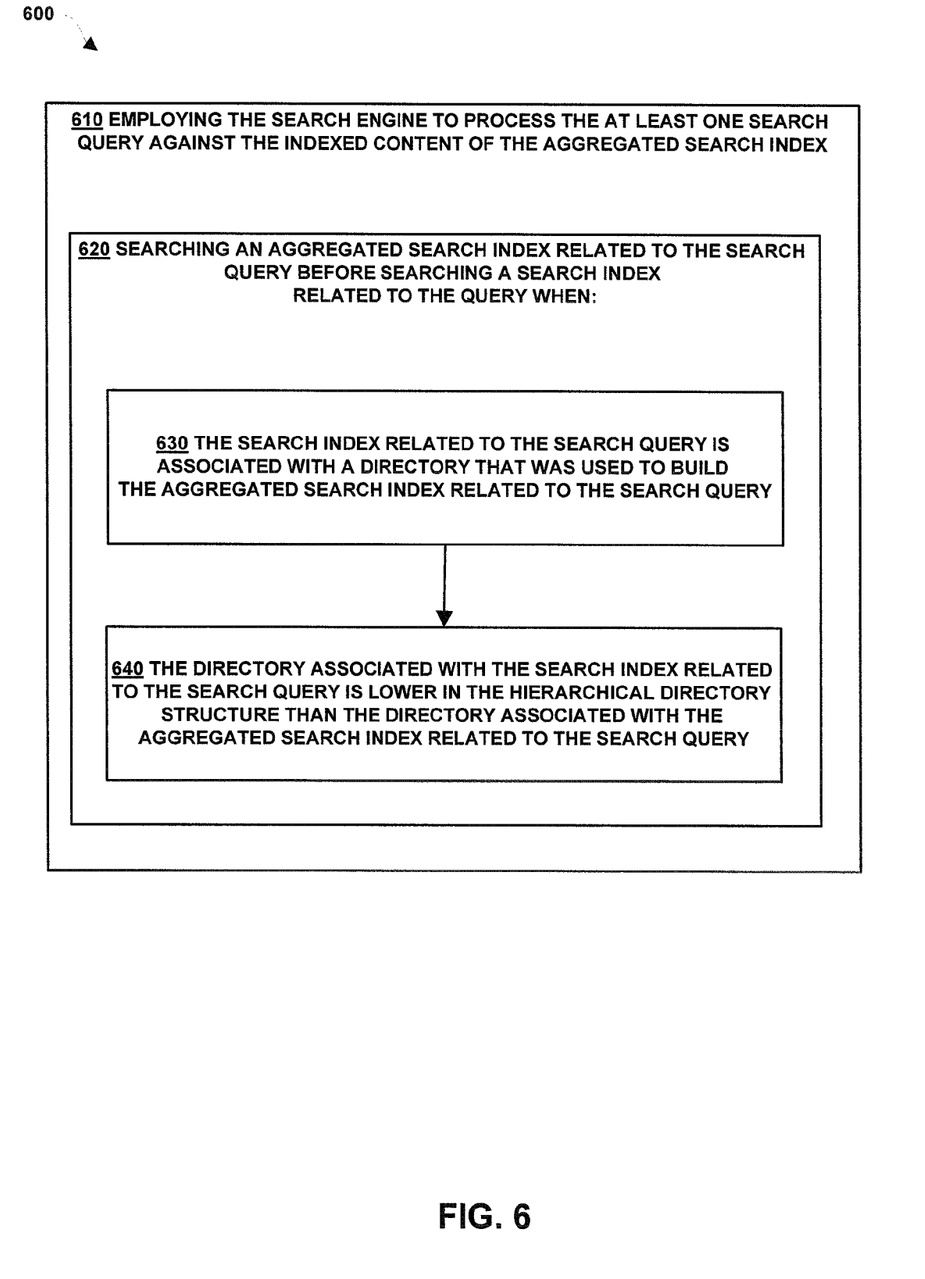
FIG. 6 is a flowchart of processing steps performed by a local search indexer to search an aggregated search index associated with a directory according to embodiments herein.

FIG. 6 is a flowchart 600 of processing steps 610-640 performed by a local search indexer 150 to search an aggregated search index associated with a directory according to embodiments herein. The steps in flowchart 600 refer to the features illustrated in the block diagrams of FIGS. 1, 2 and 3.

At step 610, the local search indexer 150 employs the search engine 170 to process a search query against the indexed content of the aggregated search index 210-2. However, it is understood that in some embodiments of the local search indexer 150, the aggregated index 210-2 is optional. If every directory contains a search index then there may be no need to have an aggregated index 210-2 at all (or if there is only one directory). If there is at least one directory without a search index, for example, then it is desirable to have at least one aggregated index 210-2 at some higher level than that directory—such an embodiment can avoid instances where a search query might otherwise fail.

At step 620, the local search indexer 150 searches the aggregated search index 210-2 related to the search query before searching a search index related to the query. In particular, at step 630, the local search indexer 150 verifies that the search index related to the search query is associated with a directory that was used to build the aggregated search index 210-2. At step 640, the local search indexer 150 further verifies that the directory associated with the search index related to the search query is lower in the hierarchical directory structure 160 than the directory associated with the aggregated search index 210-2.

For example, if all directory level two directories 220, 230, 240 were used to build the aggregated search index 210-2 along with the directory level one directory 210, then the local search indexer 150 searches through the aggregated search index 210-2 (which is stored at directory level one) instead of executing a search pattern across the directories 220, 230, 240 at directory level 2. In other words, a level two search is executed but the search pattern only incurs the time and processing costs of searching at directory level one. Thus, search results that include updates made to content at directories 220, 230, 240 are returned more efficiently than with conventional systems.

Other embodiments of a local search indexer 150 disclosed herein also include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

Note again that techniques herein are well suited for a local search indexer 150 to allow for an optimized search within a web server that returns more accurate search results while maintaining independent control as to defining search patterns, search prioritization, and content available for search. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
  organizing, at a web server, content according to a hierarchical directory structure, the hierarchical directory structure including a plurality of directory levels and a plurality of directories for storing content;
  building a search index, stored at the web server, for each of the plurality of directories, each search index associated with a single one of the plurality of directories, each search index populated with indexed content based on at least an update of the content;
  building an aggregated search index, stored at the web server, populated with indexed content from at least two but less than all of the plurality of directories, the indexed content based on at least an update of the content from the directories used to build the aggregated search index; and
  employing a search engine, at the web server, to process at least one search query against the indexed content of one of the plurality of search indices and the aggregated search index to provide a search result that includes the update of the content.

2. The method as in claim 1, wherein the update of the content includes one of a search prioritization of dynamic content over static content and a search ranking of updated content over older content.

3. The method as in claim 1, wherein the aggregated search index is associated with a directory from a highest directory level of the directories used to build the aggregated search index.

4. The method as in claim 1, wherein employing the search engine, at the web server, to process search queries against the indexed content of one of the plurality of search indices and the aggregated search index includes:
  implementing a search pattern that is defined at the web server.

5. The method as in claim 4, wherein implementing the search pattern that is defined at the web server includes:
  the search engine implementing an open search pattern.

6. The method as in claim 1, wherein employing the search engine to process the at least one search query against the indexed content of one of the plurality of search indices and the aggregated search index includes:
  searching an aggregated search index related to the search query before searching a search index related to the query when:
   (i) the search index related to the search query is associated with a directory that was used to build the aggregated search index related to the search query; and
   (ii) the directory associated with the search index related to the search query is lower in the hierarchical directory structure than the directory associated with the aggregated search index related to the search query.

7. A computer readable medium comprising executable instructions encoded thereon operable on a computerized device to perform processing comprising:
  instructions for organizing, at a web server, content according to a hierarchical directory structure, the hierarchical directory structure including a plurality of directory levels and a plurality of directories for storing content;
  instructions for building a search index, stored at the web server, for each of the plurality of directories, each search index associated with a single one of the plurality of directories, each search index populated with indexed content based on at least an update of the content;
  instructions for building an aggregated search index populated with indexed content from at least two but less than all of the plurality of directories, the indexed content based on at least an update of the content from the directories used to build the aggregated search index, the at least one aggregated search index stored at the web server; and
  instructions for employing a search engine, at the web server, to process at least one search query against the indexed content of one of the plurality of search indices and the aggregated search index to provide a search result that includes the update of the content.

8. The computer readable medium as in claim 7, wherein the update of the content includes one of a search prioritization of dynamic content over static content and a search ranking of updated content over older content.

9. The computer readable medium as in claim 7, wherein the aggregated search index is associated with a directory from a highest directory level of the directories used to build the aggregated search index.

10. The computer readable medium as in claim 7, wherein the instructions for employing the search engine, at the web server, to process search queries against the indexed content of one of the plurality of search indices and the aggregated search index include:
    instructions for implementing a search pattern that is defined at the web server.

11. The computer readable medium as in claim 10, wherein the instructions for implementing a search pattern that is defined at the web server include:
    instructions for implementing an open search pattern.

12. The computer readable medium as in claim 7, wherein the instructions for employing the search engine to process the at least one search query against the indexed content of one of the plurality of search indices and the aggregated search index include:
    instructions for searching an aggregated search index related to the search query before searching a search index related to the query when:
    (i) the search index related to the search query is associated with a directory that was used to build the aggregated search index related to the search query; and
    (ii) the directory associated with the search index related to the search query is lower in the hierarchical directory structure than the directory associated with the aggregated search index related to the search query.

13. A web server system comprising:
a processor;
a memory unit that stores instructions associated with an application executed by the processor; and
an interconnect coupling the processor and the memory unit, enabling the computer system to execute the application and perform operations of:
    organizing, at a web server, content according to a hierarchical directory structure, the hierarchical directory structure including a plurality of directory levels and a plurality of directories for storing content;
    building a search index, stored at the web server, for each of the plurality of directories, each search index associated with a single one of the plurality of directories, each search index populated with indexed content based on at least an update of the content;
    building an aggregated search index, stored at the web server, populated with indexed content from at least two but less than all of the plurality of directories, the indexed content based on at least an update of the content from the directories used to build the aggregated search index; and
    employing a search engine, at the web server, to process at least one search query against the indexed content of one of the plurality of search indices and the aggregated search index to provide a search result that includes the update of the content.

* * * * *